(No Model.)

G. J. ORR.
AUTOMATIC RELIEF DEVICE FOR PUMPS.

No. 252,133. Patented Jan. 10, 1882.

Witnesses
Chas. H. Smith
Harold Serrell

Inventor
Gilbert J. Orr
per L. W. Serrell

UNITED STATES PATENT OFFICE.

GILBERT J. ORR, OF NEW YORK, N. Y.

AUTOMATIC RELIEF DEVICE FOR PUMPS.

SPECIFICATION forming part of Letters Patent No. 252,133, dated January 10, 1882.

Application filed October 11, 1881. (No model.)

*To all whom it may concern:*

Be it known that I, GILBERT J. ORR, of the city and State of New York, have invented an Improved Automatic Relief Device for Pumps, of which the following is a specification.

Pumps in steam fire-engines have been provided with an automatic relief device, whereby an increase of water-pressure due to the closing of the delivery-nozzle or any obstruction of the hose causes a movement of mechanism that opens a passage for the water from the delivery of the inlet water-way of the pump, thus allowing the water to circulate through the pump. Devices for this purpose are shown in Letters Patent No. 151,045 and 156,371, heretofore granted to me.

In almost all steam-pumps there is an air-vessel to form a relief to the unequal discharge of water from the pump and render the flow of water uniform through the hose. In steam fire-engines especially the air in the expansion air-vessel is liable to become exhausted by being carried away by the flow of water. The consequence is that the pump works very irregularly, the water flows more rapidly at one part of the stroke than the other, and the hose jumps about and becomes unmanageable, or partially so, and it is very liable to be burst by the concussion of the water.

My present invention is for lessening the risk of injury to the hose when the air in the air-vessel may become exhausted, and for relieving the pressure when it becomes too great, by automatically returning the water to the suction side of the pump.

Figure 1:
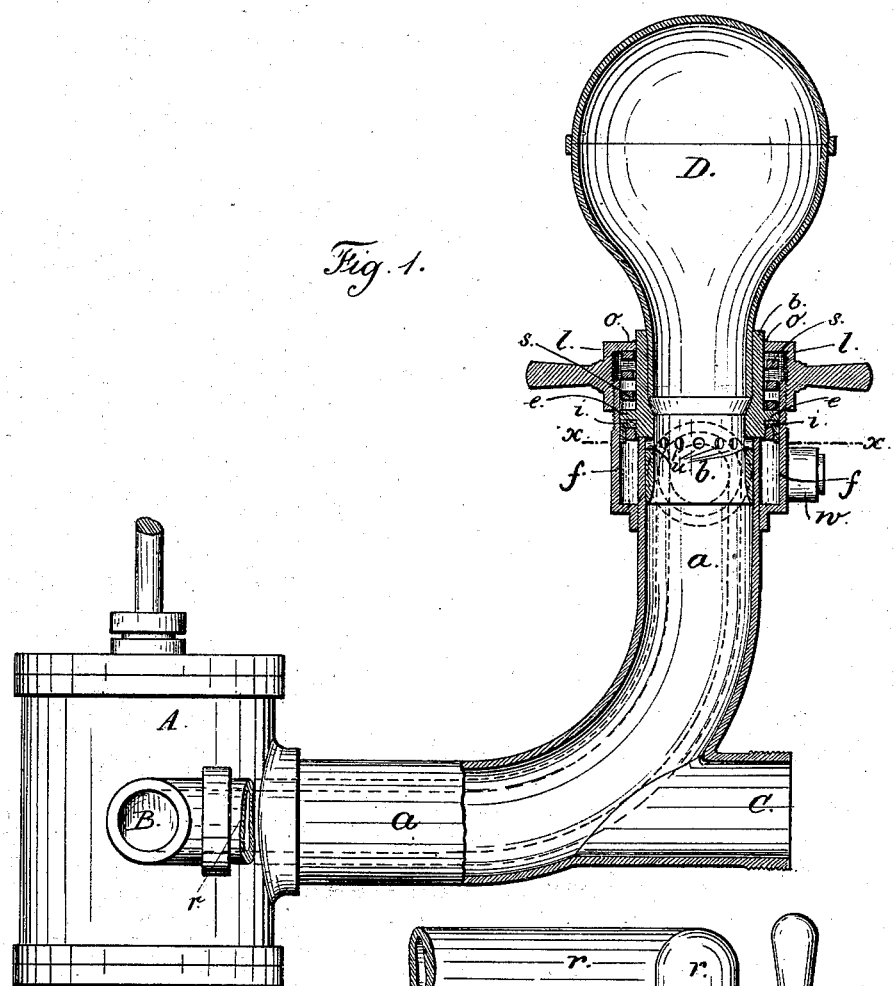
Figure 2:
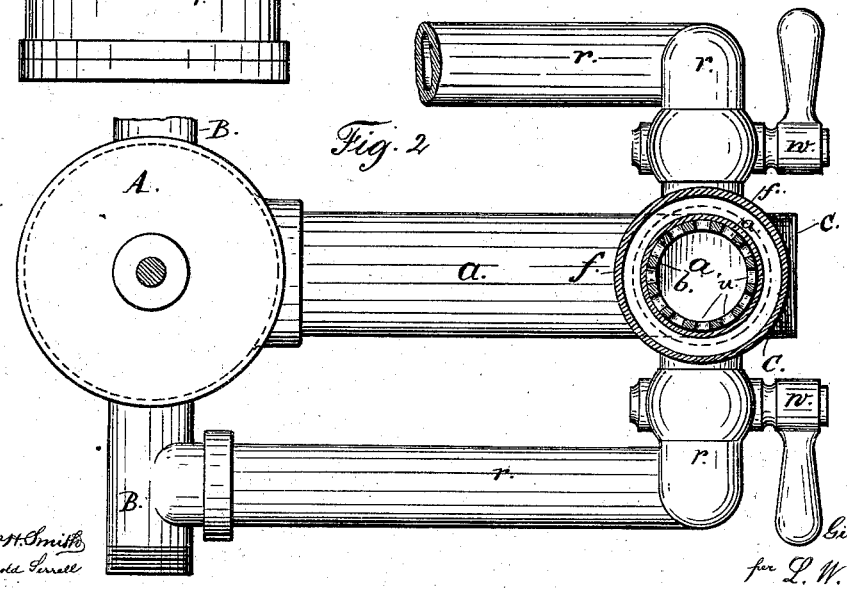

In the drawings, Figure 1 is a vertical section of the automatic relief mechanism, and Fig. 2 is a plan view below the line $xx$.

At A, I have represented a portion of a pump, B B being the inlet water-ways, and C the discharge-pipe. These may be of any ordinary construction. The pipe $a$ rises above the discharge-pipe C to the air-vessel D, which is to be of any desired size. This air-vessel is usually stationary; but I construct the same so that it will move vertically. This is accomplished by employing the telescopic tube $b$ at the lower end of the air-vessel, sliding within the upper end of the pipe $a$, and around this tube $b$ are the annular flange $e$ and cup-leather packing $i$ within the cylinder $f$, that is larger than and rises above the upper end of the tube $a$. The sleeve $l$ is screwed upon the outside of the cylinder $f$, and its upper end is contracted at $o$, so as to surround the tube $b$, and between its inward flange $o$ and the top of the flange $e$ there is a helical spring, $s$. By screwing down this spring $s$ the force with which the air vessel will be held down will be increased, and the reverse by unscrewing said sleeve. A weighted lever, with an eye surrounding the tube $b$ and bearing upon pivots at opposite sides of the tube, may take the place of the spring and sleeve.

It will now be apparent that the air-vessel can rise and fall by variations in the pressure of water acting within it, the tube $b$ sliding within the tube $a$ and the packing $i$ sliding up and down in the cylinder $f$. This motion will be but little when there is sufficient air within the air-vessel; but so soon as the water acts upon the air-vessel without the intervening elastic air the air-vessel will play up and down in consequence of the unequal pressure of water as discharged from the pump. This play of the air-vessel will lessen and nearly remove the risk of injury to the pump or hose.

I am able to combine with this automatic air-vessel relief an automatic water-relief by connecting the cylinder $f$ to the return water-ways of the pump by the passage-ways or pipes $r$ and providing openings at $u$ in the pipe $b$, so that when these openings rise above the top of the tube $a$ the water will discharge into the suction-ways of the pump through the pipe or pipes $r$.

I provide a cock at $w$ to prevent the return circulation from the discharge of the inlet-pipes. This sometimes has to be closed when throwing water to great heights.

This improvement is available with any character of pump, whether operated by hand or by power, whether used for pumping water, air, or any other fluid.

I claim as my invention—

1. The combination, with the air-vessel and pump, of telescopic tubes at the junction of the pipe and air-vessel, and a yielding resistance—such as a spring—to hold the air-vessel in place, but allow it to move under the unequal pressure and discharge of water from the pump, substantially as set forth.

2. The combination, with the air-vessel and the tubes $a$ $b$, of the cylinder $f$, sleeve $l$, spring $s$, and packing $i$, substantially as set forth.

3. The combination, with the air-vessel, the pipe $a$, and cylinder $f$, of the pipes leading to the suction-ways of the pump, the packing $i$, and the tube $b$, entering into the tube $a$, and provided with holes, substantially as set forth.

Signed by me this 3d day of October, A. D. 1881.

GILBERT J. ORR.

Witnesses:
WILLIAM G. MOTT,
LEMUEL W. SERRELL.